(12) United States Patent
Dillaman

(10) Patent No.: US 11,403,002 B2
(45) Date of Patent: Aug. 2, 2022

(54) MULTIMODAL ACCESS TO BLOCK DEVICES IN A DISTRIBUTED STORAGE SYSTEM

(71) Applicant: RED HAT, INC., Raleigh, NC (US)

(72) Inventor: Jason Dillaman, Richmond, VA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/943,944

(22) Filed: Jul. 30, 2020

(65) Prior Publication Data
US 2022/0035537 A1    Feb. 3, 2022

(51) Int. Cl.
*G06F 12/00*       (2006.01)
*G06F 3/06*        (2006.01)
*G06F 11/14*       (2006.01)

(52) U.S. Cl.
CPC ............ *G06F 3/0619* (2013.01); *G06F 3/064* (2013.01); *G06F 3/067* (2013.01); *G06F 3/0653* (2013.01); *G06F 11/1461* (2013.01); *G06F 11/1464* (2013.01); *G06F 11/1469* (2013.01); *G06F 2201/84* (2013.01)

(58) Field of Classification Search
CPC ............. G06F 3/0619; G06F 11/1461; G06F 11/1469; G06F 3/067; G06F 3/064; G06F 3/0653; G06F 11/1464; G06F 2201/84
See application file for complete search history.

(56) References Cited

U.S. PATENT DOCUMENTS

| | | | |
|---|---|---|---|
| 8,892,698 B2 | 11/2014 | Baptist et al. | |
| 11,044,118 B1* | 6/2021 | Reed | H04L 63/0272 |
| 2015/0154418 A1* | 6/2015 | Redberg | G06F 21/6218 |
| | | | 713/165 |
| 2016/0246802 A1* | 8/2016 | Regni | G06F 16/20 |
| 2017/0103000 A1* | 4/2017 | Iyengar | G06F 11/1464 |
| 2017/0255401 A1* | 9/2017 | Basham | G06F 3/0619 |
| 2021/0255885 A1* | 8/2021 | Purohit | G06F 9/45558 |

OTHER PUBLICATIONS

Block Device Commands, Ceph Documentation, https://docs.ceph.com/docs/mimic/rbd/rados-rbd-cmds/, downloaded Apr. 24, 2020, 6 pages.
Custom RGW Bucket to RADOS Pool Mapping, https://tracker.ceph.com/projects/ceph/wiki/Custom_RGW_Bucket_to_RADOS_Pool_mapping#Custom-RGW-Bucket-to-RADOS-Pool-mapping, downloaded Apr. 24, 2020, 1 page.
Ceph "CDS Pacific: RBD", YouTube, uploaded Apr. 2, 2020, https://www.youtube.com/watch?v=Oh8pSInKC9E.

* cited by examiner

*Primary Examiner* — John A Lane
(74) *Attorney, Agent, or Firm* — Lowenstein Sandler LLP

(57) ABSTRACT

Systems and methods for providing multimodal access to block devices in a distributed storage system are disclosed. In one implementation, a processing device may identify a block device snapshot stored at a block-based repository of a distributed storage system. The block device may also implement an object-based proxy container associated with the block-based repository. The processing device may further provide, to a client of the distributed storage system, access to the object-based proxy container via an object-based gateway of the distributed storage system.

20 Claims, 8 Drawing Sheets

MULTIMODAL ACCESS TO BLOCK DEVICES IN A DISTRIBUTED STORAGE SYSTEM

TECHNICAL FIELD

The present disclosure is generally related to computer systems, and more particularly, to multimodal access to block devices in a distributed storage system.

BACKGROUND

Modern computers often store data in a distributed data store to enhance the access, redundancy, and capacity of data storage devices. The distributed data store may include multiple storage nodes that function to store, organize, and provide access to data. The distributed data store may include a server portion that manages the data and a client portion that provides access to the data. The client portion may include code (e.g., client module) that enables a client device to access data of the distributed data store.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Figure 1:
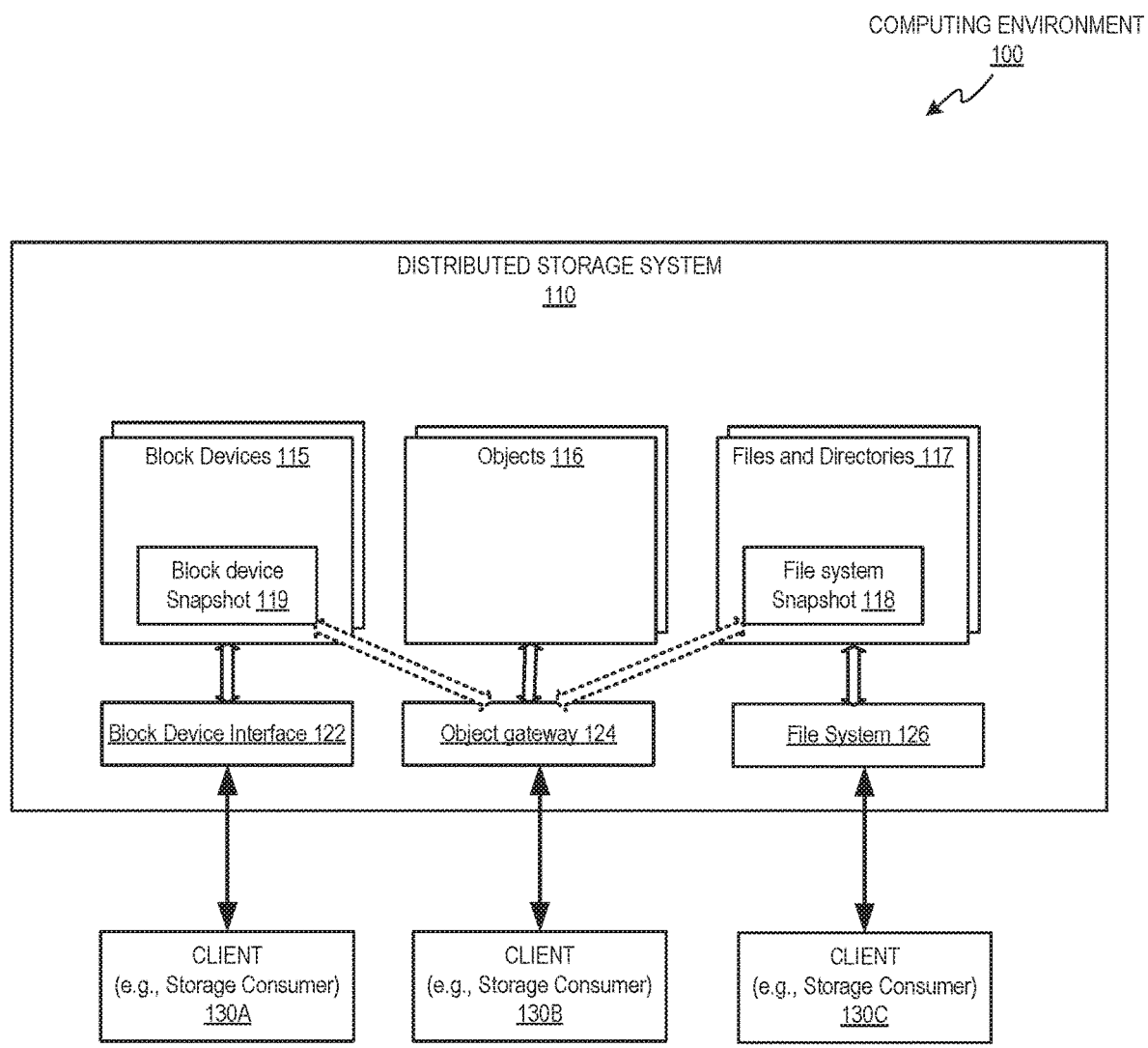
FIG. 1 illustrates an exemplary computing environment in which implementations of the disclosure may operate.

Described herein are methods and systems for providing multimodal block device access within a distributed storage system. Distributed storage systems often incorporate the features of distributed data stores and enable multiple clients to access and modify data of the distributed storage system. The distributed data stores may enhance performance of a computer system, reliability of the computer system, or a combination thereof. The distributed data stores may include a set of physical devices, virtual devices, or a combination thereof. Clients of the distributed system often employ code designed to interact with the distributed storage system via multiple paths to access the data of the distributed storage system. Data may be stored at block-based repositories (e.g., block devices), file-based repositories (e.g., files and directories), object-based repositories (e.g., object-based proxy containers), other repositories, or a combination thereof. Each type of repository may have a dedicated API interface that may be used by clients to access the corresponding repository type.

A block-based repository divides a file into singular units of data and stores these units as separate data entities within block devices. Each data entity (e.g., a block) has a different address, so they may be stored at different block devices, as opposed to a file structure. A block device refers to a computer data storage device that supports reading data in large, fixed-size blocks, sectors, or clusters, as opposed to a small number of bytes at a time. An object-based repository manages data storage as distinct units, called objects that may be stored separately as opposed to being stored in files and folders. The object storage may combine the pieces of data that make up a file, may add relevant metadata to the file, and may store both data and metadata in a flat address space called a storage pool. Accordingly, the object-based repository may enable a deep analysis of the use and function of the data in the storage pool.

In one implementation, in order for an object-based gateway to be able to access a file stored at a file-based repository, the file is typically replicated to an object-based repository that is accessible to the object-based gateway. Similarly, to enable a client of an object-based gateway to access a block stored at a block device of the storage system, the block is replicated to an object-based repository that is accessible to the object-based gateway. The requirement to replicate data objects between the different types of repositories increases the cost of storage space as well as adversely affects the performance of the storage system, as a result of managing and creating data replications across the repositories.

Certain solutions may offer deduplication techniques to remove repetitive or redundant data that may no longer be needed at certain repositories. While the deduplication approach may reduce the overall storage space by deleting duplicated data, the storage system may still experience performance penalties due to the requirement to manage and execute the deduplication processes as well as managing significant amount of metadata associated with keeping track of data usage of data objects within the system.

The present disclosure alleviates the above-noted and other deficiencies by enabling certain immutable block devices (e.g., snapshots) stored at a block device to be exposed via an object-based gateway without duplicating the snapshot to an object-based repository. In certain implementations, the object-based gateway may implement a RESTful web service interface that is capable of reading and writing immutable data objects (i.e. objects that cannot be modified after being created). REpresentational State Transfer (REST) is a style of software architecture for distributed systems such as the World Wide Web. A RESTful web service is a web service that is implemented using HTTP and the principals of REST. The data stored at block devices of a distributed storage system are mutable (i.e. data objects that may be modified after being created), thus cannot be directly accessed using an object-based interface, which assumes that data is immutable. Accordingly, in order to access data objects stored at a block device using an object-based interface, the data object are duplicated to an object-based repository (as immutable data objects), which then allows an object-based interface (e.g., a RESTful web service) to access the data object. In order to avoid deduplication, block devices creates block device snapshots, which are immutable objects. The block device snapshots may then be exposed via an object-based interface, thus allowing a client of the object-based interface to access block device snapshots directly without duplicating the block device snapshots to an object-based repository.

In one implementation, a block device snapshot may be stored at a block device of a distributed storage system. A block device snapshot may refer to an immutable data object representing data of one or more associated block device at a given point in time. The block device may be exposed to a client of an object-based interface by implementing an object-based proxy container that is associated with the block device, in order to enable the block device snapshot to be accessible to a client using an object-based interface of the distributed storage system. As an example, the block device may be exposed, via an object gateway interface (e.g., a RESTful web service interface), as an object-based proxy container (e.g., an Amazon S3 bucket), which is associated with one or more data objects. Accordingly, when the block device is mapped to the object-based proxy container, a block device snapshot stored at the block device may be made accessible to the client via the object gateway interface, and thus may be viewed, updated, or deleted by the client using the object gateway interface. Additionally, using the object gateway interface, the client may create a new block device snapshot and may store the new block device snapshot at the block device that is exposed via the object gateway bucket. For example, when the client modifies an existing block device snapshot, a new block device snapshot representing the modifications of the original block device snapshot may be created and may be stored at the block device directly without having to duplicate the new snapshot on an object-based repository. Therefore, the present disclosure enables a bi-directional access to block devices from an object-based interface without duplication of data between the different repositories of the distributed storage system.

In one implementation, in order to enable a exposing a block device via an object gateway interface, an administrator of the distributed storage system may create an object-based proxy container (e.g., an Amazon S3 bucket), which would access a block device pool of one or more block devices. The object-based proxy container may look like a container when operating within the distributed storage system, however it may represent a hierarchical metadata used for identifying the number and location of stored objects, rather than containing the stored objects. For example, data of a certain user or client of distributed storage system can be referenced by a specific object-based proxy container. In this case, the administrator may further specify whether a client is allowed to view, update, delete, and/or create block device snapshots stored at the block device pool. When the object-based proxy container is created and configured, a client of the distributed storage system may access block device snapshots stored at the block device pool that is exposed via the object-based proxy container, according to the permissions that were set by the administrator.

In certain implementations, accessing the block device pool using an object-based interface may be performed by translating an object-based gateway call that is used by a client to access the block device pool, to a block-based API call that can be executed against the block-based storage. As an illustrative example, when a client initiates a call to create a block device snapshot using an object-based interface create snapshot call, the create snapshot call and associated data structures may be translated to an equivalent block device snapshot create call, and equivalent data structures, of a block-based API. The block-based API snapshot create call may then access the block device where the snapshot is to be created and may create the snapshot as specified by the client.

In a given implementation, an object-based proxy container may be implemented to expose a snapshot delta block. A snapshot delta refers to a specific type of snapshot representing the differences between two snapshots of the same underlying one or more blocks. The two snapshots may be created at different points in time, thus the data included in one snapshot may be different from the other snapshot. In one example, the snapshot delta may be utilized to enable more efficient backup policies within the distributed storage system. For example, a block device snapshot representing a full snapshot of a block may have a backup policy enabling backup of the snapshot on a weekly basis, whereas a block device snapshot delta may have another backup policy enabling backup of the snapshot delta on a daily basis, for example. Additionally, a separate object-based proxy container may be expose snapshot delta objects, such that a client may access and manage snapshot delta objects of a given block via the object-based interface.

In yet another implementation, a certain file stored at a file-based repository of the distributed storage system may be accessed by an object-based gateway by exposing the file-based repository via an object-based proxy container, which enables the object-based gateway to access the file. Additionally, a client of the object-based gateway that has proper permission may use the object-based gateway to create a new file at the file-based repository that is exposed via the object-based proxy container. The permissions to view, create, and/or delete files using the object-based gateway may be specified by an administrator of the distributed storage system.

Thus, the systems and methods described herein represent improvements to the functionality of general purpose or specialized computing devices, by implementing multi-modal access to block devices as well as data files stored at a distributed storage system via an object-based interface. The ability to expose a block-based repository via an object-based container eliminates the need to duplicate data between the block-based and the object-based repositories in order to enable access to the data from two or more different types of API interfaces, thus preserving storage space of the storage system. Additionally, the translation approach between the different types of repositories requires no additional metadata or processing power to manage deduplication of the same data, while introducing negligible additional compute time to the operations of the storage system, thus improving the overall performance of the storage system.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 illustrates an exemplary computing environment 100 in which implementations of the disclosure may operate. Computing environment 100 may include multiple computing devices associated with one or more cloud environments, data centers, data rooms, other arrangement of devices, or a combination thereof. In one example, computing environment 100 may include a distributed storage system 110 (e.g., storage provider), one or more data access methodologies 115-117 (e.g., blocks, objects, file storage), and one or more clients 130A-C (e.g., storage consumers).

Distributed storage system 110 may store and manage the distribution of data across multiple storage nodes and may provide access to data via a block-based storage interface 122, an object-based gateway interface 124, a file system 126, or a combination thereof. A block-based storage service may provide access to data at a block level and may be similar to one or more block level storage devices (e.g., Storage Area Network (SAN) device or array). An object-based storage may provide access to immutable data objects using an object-based gateway (e.g., a RESTful web service interface). A file-based storage service may provide access to data at a file and directory level and may be similar to file level storage devices (e.g., Network Attached Storage (NAS) devices). In one example, distributed storage system 110 may be the same or similar to Ceph, Gluster, Oracle® Automatic Storage Management (e.g., ASM), Hadoop® Distributed File System (HDFS), Andrew File System (AFS), Google® File System (GFS), other data storage system, or a combination thereof that is capable of storing object data (e.g. content) on one or more storage nodes.

Block devices 115 represents block-based storage and may include multiple block devices for storing mutable data objects within distributed storage system 110. In an implementation, block-based storage interfaces may be used to store data within media devices such as hard disks, CDs, floppy disks, and a combination thereof. Block devices 115 may store data over multiple object storage daemons (OSD)s within a storage cluster. In certain implementations, block devices 115 may leverage the reliable autonomic distributed object store (RADOS) capabilities such as snapshot creation, replication, and fault-tolerance. RADOS is an open source object storage service that is an integral part of distributed storage system 110 (e.g., Ceph storage system). In this case, a RADOS block device (RBD) interface 122 may interact with storage nodes to store and retrieve data using kernel modules.

Block device snapshot 119 may be an immutable data object representing data of one or more blocks stored at a block device at a given point in time. Block device snapshot 119 may be accessed using block device interface 122, as well as using objects gateway 124 upon implementing an object-based proxy container that is associated with a block device containing block device snapshot 119, as explained in more details below in FIG. 2. In an illustrative example, client 130A may access block devices 115 as well as block device snapshot 119 for viewing, updating, deleting, creating data objects within block devices 115. To perform these operations on data objects of block devise 115, Client 130A may use API calls of block device interface 122.

Objects 116 represents an object-based repository within distributed storage system 110. In certain implementations, objects 116 may be immutable data objects (i.e. objects that cannot be modified after being created) that may be access using an object gateway 124. In an illustrative example, similar to block devices 115, object gateway may leverage RADOS capabilities as a RADOS gateway (RGW) in the form of a RESTful web service interface that may read and write data to objects 116. In this case, object gateway 124 may use object-based proxy containers for accessing objects 116. Object-based proxy containers refer to a special type of hierarchical metadata used for identifying the number and location of objects used for storing certain data (e.g., data of a certain user or client of distributed storage system 110). In some implementations, object gateway 124 may store data in the same storage cluster used to store data by file system 126 or by block device interface 122. In this case, each interface has a separate API interface for accessing the corresponding data type. In an illustrative example, client 130B may access objects 116 using object gateway 124 for viewing and/or updating objects within the object-based repository (e.g., objects 116). Additionally, client 130B may access block device snapshot 119 as well as file system snapshot 118 using object gateway 124, by implementing an object-based proxy container that is associated with an RBD block device containing block device snapshot 119, and another object-based proxy container to a file system directory containing file system snapshot 118, as explained in more details herein below.

Files and directories 117 represents a file-based repository within distributed storage system 110. In certain implementations, files and directories 117 may be mutable files and directories stored at various media devices such as hard disks, CDs, tapes, or a combination thereof. Files and directories 117 may be access using file system interface 126. Files and directories 117 may also contain file system snapshot 118, which is an immutable object representing data of a specific disk at a given point in time. In an illustrative example, client 130C may access File and directories 117 using file system interface 126 for viewing, updating. Deleting, or creating files and directories within the file-based repository. Additionally, client 130C may access file system snapshot 118 and create new file system snapshots of one or more disks within files and directories 117 using API calls of file system interface 126.

Clients 130A-C may be computing devices that access data hosted at distributed storage system 110. Clients 130A-C may each include a client portion of the object access service (e.g., standardized storage access technology) and may function as a client (e.g., storage consumer) of one or more of the storages nodes (e.g., blocks, objects, files). The client portion of the object access service may execute at any level of privilege such as running as part of a kernel or in a kernel mode (e.g., supervisor, master, privileged mode) or as part of a user space in user mode. Object access service may be packaged with an operating system or may be added or installed to an existing operating system. In one example, object access service may include a mount process (e.g., daemon, service) that runs on clients 130A-C and may support an operating systems native API. The native API may be any standardized or proprietary operating system API, such as the Portable Operating System Interview (POSIX) API or the Microsoft Windows® API.

Clients 130A-C may be physical devices (e.g., physical machines), virtual devices (e.g., virtual machines, containers), or a combination thereof. One or more of the clients may be absent virtualization technology and one or more of the clients may provide one or more levels of virtualization. The levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Computing environment 100 may include one or more networks. The one or more networks may include a public network (e.g., the internet), a private network (e.g., a local area network (LAN) or wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that may be implemented using various data processing equipment, communication towers, etc.

Figure 2:
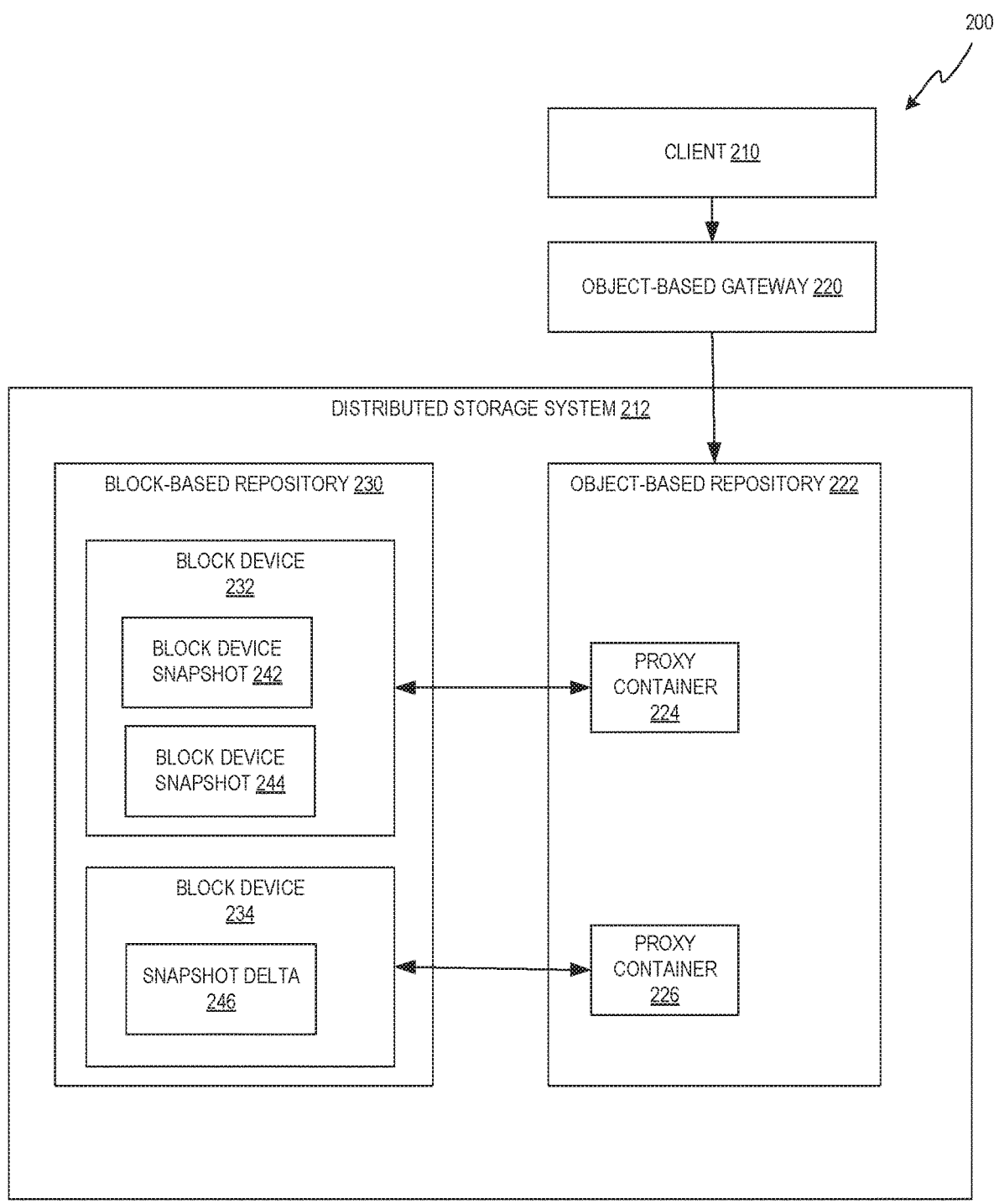
FIG. 2 illustrates the process of implementing an object-based proxy container of an object-based repository that is associated with a block device of a block-based repository within a distributed storage system, in accordance with one or more aspects of the present disclosure.

FIG. 2 illustrates the process of implementing an object-based proxy container of an object-based repository that is associated with a block device of a block-based repository within a distributed storage system, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., the computer system 500 of FIG. 5 or apparatus 700 of FIG. 7) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

In an implementation, distributed storage system 212 may be the same or similar to distributed storage system 110 of FIG. 1. Distributed storage system 212 may contain a block-based repository 230 and an object-based repository 222. In other implementations, distributed storage system 212 may include multiple block-based and object-based repositories. Client 210 of distributed storage system 212 may access object-based repository 222 using object-based gateway 220. In an illustrative example, object-based gateway 220 may be a RESTful web service that may provide an API to client 210 for accessing immutable data objects stored at object-based repository 222. In this case, client 210 may use the RESTful web service to access object-based proxy containers 224, 226 of object-based repository 222.

Proxy container 224 may be associated with block device 232 of block-based repository 230, in order to enable client 210 to access block device snapshots stored at block device 232 using object-based gateway 220. Because object-based gateway 220 may access immutable data objects stored at a certain repository, upon associating proxy container 224 with block device 232, object-based gateway 220 may be able to access block device snapshots stored at block device 232, for example, block device snapshot 242 and block device snapshot 244. Block device snapshots 242, 244 may each represent a full snapshot of a corresponding block stored at block device 232. In one implementation, to enable exposing a block-based repository via an object-based proxy container, an administrator of distributed storage system 212 may configure proxy container 224 to access block device 232 and proxy container 226 to access block device 234. The administrator may further configure whether client 210 can use proxy container 224 (via object-based gateway 220) to view, update, delete, and/or create block device snapshots stored at block device 232.

In an implementation, when client 210 requests certain operations to be performed on block device snapshots 242, 244 using object-based gateway 220, a processing logic implementing method 200 may translate object-based gateway calls that are received from client 210 to equivalent block-based API calls, in order to translate the object-based programming interface and data structures to corresponding block-based programming interface and data structure that are applicable to block device 232. As an example, when client 210 makes a request to view block device snapshot 242 using object-based gateway 220 read snapshot API call, the read snapshot call may be translated to an equivalent block device snapshot read call of a block-based API. The block-based API snapshot read call may then access block device 232 where snapshot 242 is located and may retrieve data of block device snapshot 242. The data of block device snapshot 242 may then be translated to object-based data structure and then may be delivered to client 210 via object-based gateway 220 (e.g., as a return parameter to the object-based read snapshot API call).

Proxy container 226 may be associated with block device 234 of block-based repository 230, in order to enable client 210 to access snapshots stored at block device 234 using object-based gateway 220. Block device snapshots may include full snapshots of the data stored at a given block or group of blocks, and may also include snapshot delta objects (e.g., a specific type of snapshot representing differences between two snapshots of the same underlying block). Similar to proxy container 224, proxy container 226 may be configured by an administrator of distributed storage system 212 to access block device 234. The administrator may further configure whether client 210 can use proxy container 226 for reading, deleting, and/or creating snapshot delta objects stored at block device 234. Additionally, when client 210 requests certain operations to be performed on snapshot delta object 246 using object-based gateway 220, a processing logic implementing method 200 may translate object-based gateway calls that are received from client 210 to equivalent block-based API calls, in order to translate the object-based programming interface and data structures to corresponding block-based programming interface and data structure that are applicable to block device 234 and snapshot delta object 246. In certain implementations, the processing logic may further assign a specific backup policy to proxy container 226 that may be different than another backup policy assigned to proxy container 224. For example, if proxy container 224 is associated with full block device snapshots, it may be assigned a backup policy with low frequency of backup operations, whereas proxy container 226 that is 226 that is associated with snapshot delta objects may be assigned a second backup policy with high frequency of backup operations.

Figure 3:
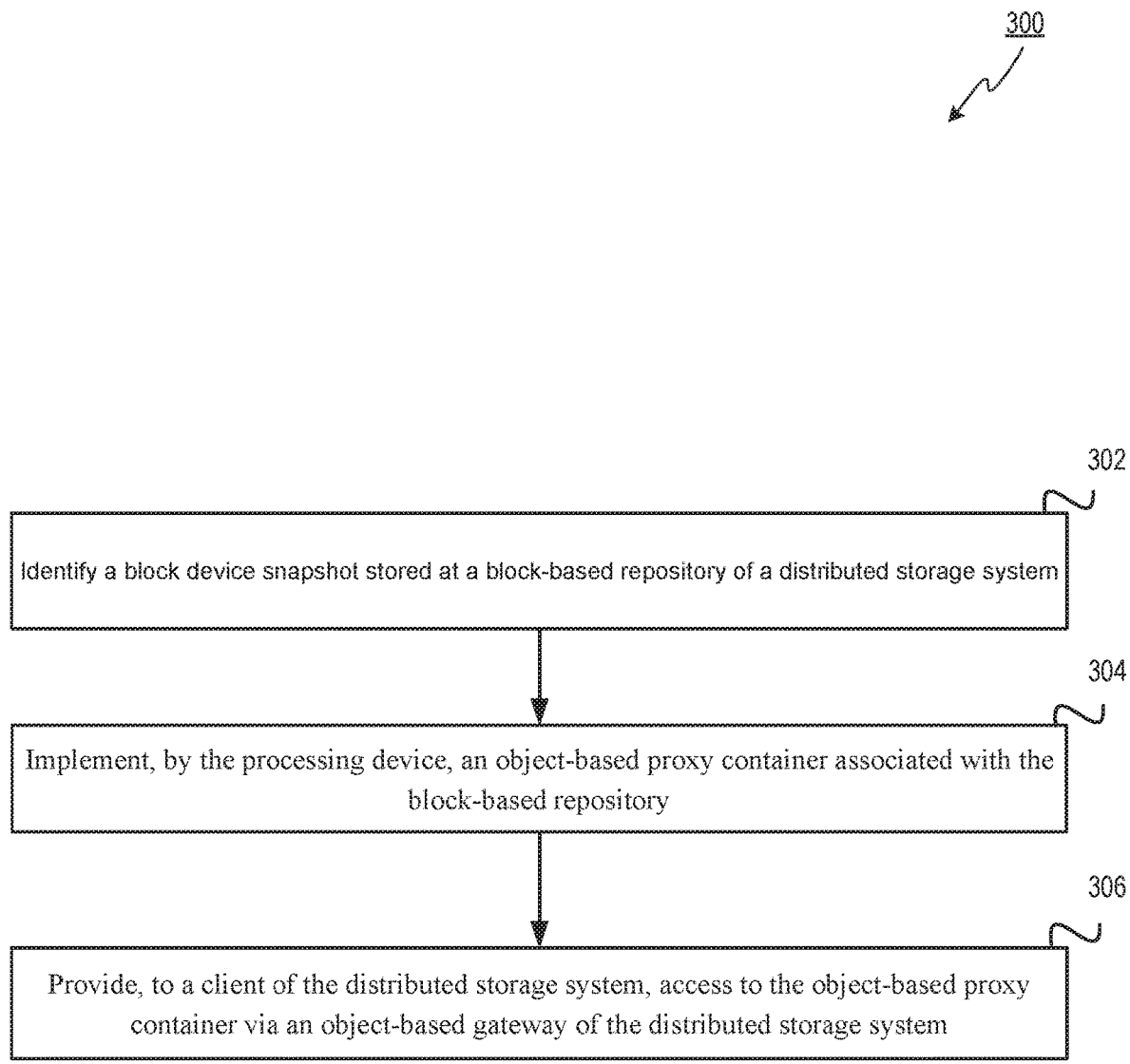
FIG. 3 is a flow diagram of an example method of supporting multimodal access to block devices in a distributed storage system, in accordance with one or more aspects of the present disclosure.

FIG. 3 is a flow diagram of an example method of supporting multimodal access to block devices in a distributed storage system, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computer system 500 of FIG. 5 or apparatus 700 of FIG. 7) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel or in arbitrary selected orders.

Referring to FIG. 3, at operation 302, the processing logic may identify a block device snapshot stored at a block-based repository of a distributed storage system. In implementations, the block device snapshot may be an immutable data object representing data of a block device at a given point in time. The block device snapshot may be accessible through a block-based interface that is responsible for making a block-based repository of a distributed storage system accessible to clients of the storage system, as explained in more details herein.

At operation 304, the processing logic may implement an object-based proxy container (e.g., a bucket) associated with the block-based repository of the distributed storage system. In implementations, the distributed storage system may include block-based repositories, object-based repositories, and file-based repositories. Implementing the object-based proxy container that is associated with the block-based repository may enable an object-based gateway to access the block device snapshot stored in the block-based repository without replicating the block device snapshot to an object-based repository.

At operation 306, responsive implementing the object-based proxy container, the processing logic may provide access to the block device snapshot to a client of the storage system. The client may use an object-based gateway (e.g., a RESTful web service) to access the block device snapshot using the object-based proxy container that is associated with the block-based repository storing the block device snapshot, as explained in more details herein.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., computer system 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

Figure 4:
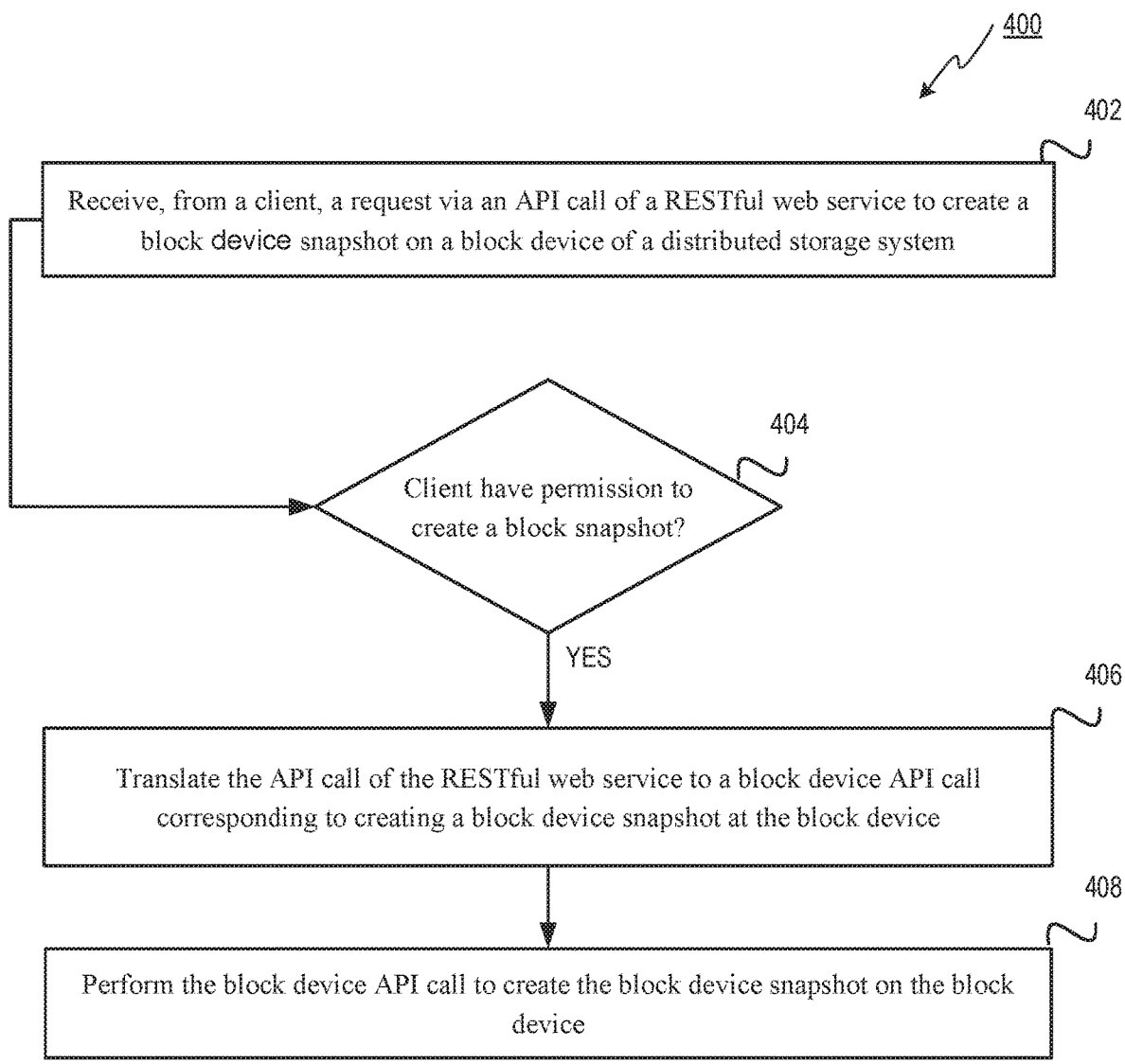
FIG. 4 illustrates an example method for supporting bi-directional multimodal block device access using an object-based gateway, in accordance with one or more aspects of the present disclosure.

FIG. 4 illustrates an example method for supporting bi-directional multimodal block device access using an object-based gateway, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500 of FIG. 5 or apparatus 700 of FIG. 7) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

At operation 402, the processing logic may receive, from a client of a distributed storage system, a request via an API call of a RESTful web service to create a block device snapshot on a block device of the distributed storage system. In one implementation, an object-based proxy container of the RESTful web service is associated with the block device containing the block device snapshot, in order to enable the RESTful web service call to access the block device.

At operation 404, the processing logic may determine whether the client has permission to create a block device snapshot at the block device. For example, an administrator of the distributed storage system may have granted permission to clients to create block device snapshots (or other data objects) at the block device using the object-based proxy container that is associated with the block device. If the processing logic determines that the client has permission to create block device snapshots at the block device, the processing logic may proceed to create the block device snapshot as specified by the client at operation 406.

At operation 406, the processing logic may translate the API call of the RESTful web service to a block device API call that is responsible for creating a block device snapshot at the block device. In certain implementations, translating the RESTful API call into a block device API call may involve translating an object-based programming interface and data structures into a corresponding block-based programming interface and data structures. The block-based API call and data structures may be interpreted and executed by the block device in order to perform the operation requested by the client (e.g., to perform the create snapshot operation as requested by the client).

At operation 408, subsequent to translating the create snapshot API call, the processing logic may perform the block device API call to create the block device snapshot on the block device, as specified by the client. For example, a client may provide, as a parameter to the create snapshot API call, a reference to a specific block stored at the block device. The processing logic may then create a block device snapshot of the data stored at the referenced block at the current point in time, and may store the created block device snapshot at the block device.

Figure 5:
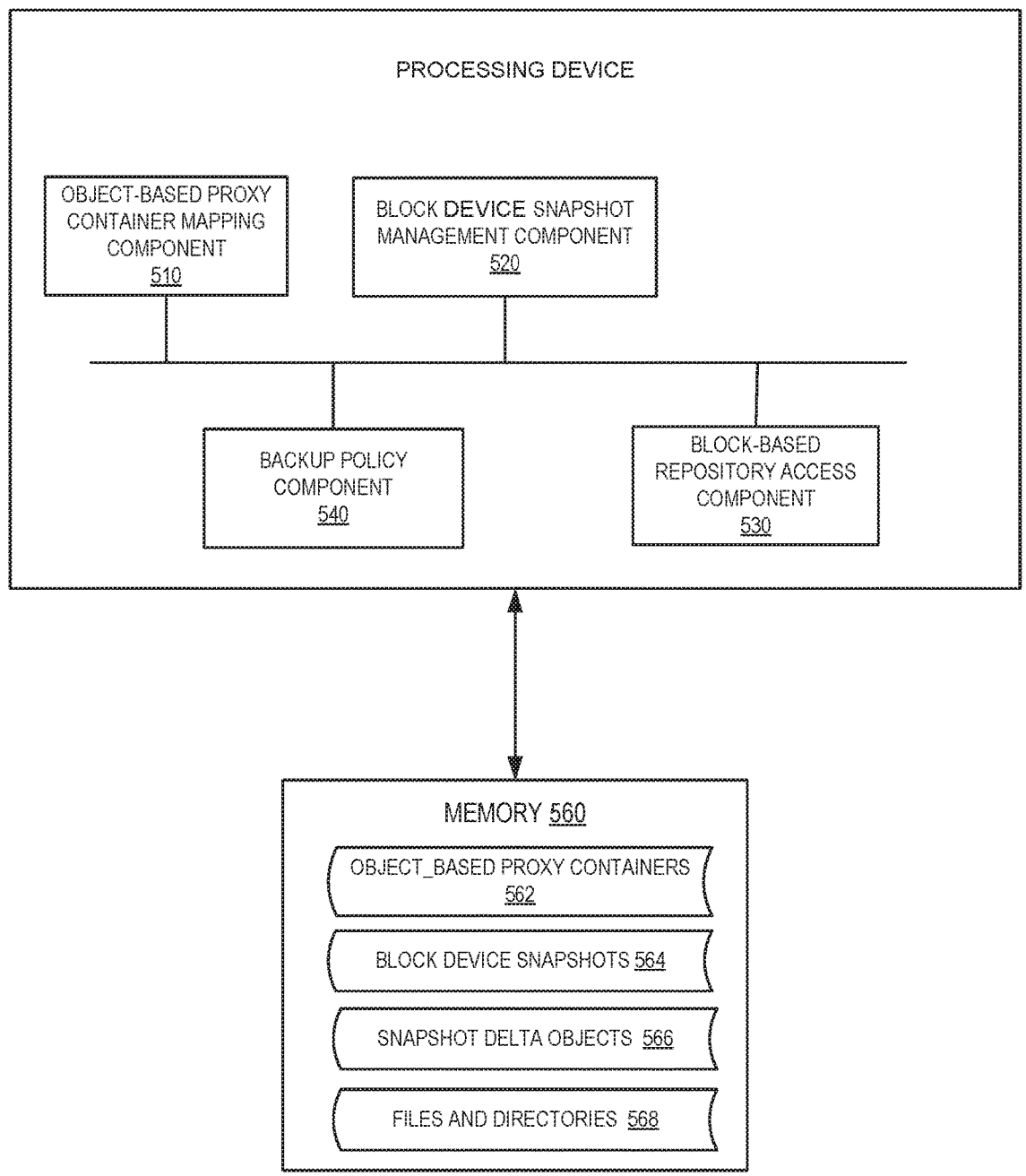
FIG. 5 depicts a block diagram of an example computer system 500 in accordance with one or more aspects of the present disclosure.

FIG. 5 depicts a block diagram of an example computer system 500 in accordance with one or more aspects of the present disclosure. Computer system 500 may include one or more processing devices and one or more memory devices. In the example shown, computer system 500 may include an object-based proxy container mapping components 510, a block device snapshot management component 520, a block-based repository access component 530, and a backup policy component 540. Components of computer system 500 may access memory 560 to implement methods in accordance to aspects of the disclosure.

Object-based proxy container mapping components 510 may enable a processing device of computer system 500 to perform association of object-based proxy containers 562 to block devices containing block device snapshots 564, in order to enable block device snapshots 564 to be accessible by an object-based gateway using object-based proxy containers 562. In one implementation, when a block device is associated with an object-based proxy container, a block device snapshot stored at the block device may be accessible, to a client of a distributed storage system deployed at computer system 500, via the object-based gateway. In an implementation, in order to enable a mapping of a block device to one of object-based proxy containers 562, object-based proxy container mapping components 510 may enable an administrator of the distributed storage system to configure an object-based proxy container to access a block device pool of one or more block devices.

In addition to association of object-based proxy containers 562 to block devices containing block device snapshots 564, object-based proxy container mapping components 510 may also be responsible for associating certain object-based proxy containers 562 to block devices containing snapshot delta objects 566. Snapshot delta objects may be created by comparing two full snapshots of a certain data block and then including the different bits of data between the two snapshots in the snapshot delta object. Alternatively, a copy-on-write or redirect-on-write indirection techniques may be utilized to create a snapshot delta object to include data modifications that occur after the creation of the full block device snapshot. In an illustrative example, object-based proxy container mapping components 510 may associate snapshot delta objects 566 with a separate object-based proxy containers 562 in order to enable different backup schedules of object-based proxy containers 562 that are associated with snapshot delta objects than the backup schedules of object-based proxy containers 562 that are associated with full block device snapshot objects.

Object-based proxy container mapping component 510 may also be responsible for associating certain object-based proxy containers 562 to files and directories 568 of the distributed storage system. In addition to being accessible from a file system of the distributed storage system, object-based proxy container mapping component 510 may associate one or more object-based proxy containers 562 with file system snapshots that are stored at a file-based repository of the distributed storage system. In an implementation, object-based proxy container mapping component 510 may create the file system snapshot by packaging the file system files and directories within another container (e.g., a ZIP file or TAR container that preserves the file system structure and attributes within a single file). In this case, the creation of this file system container may be dynamically generated in memory to service the object-based gateway requests. Accordingly, file system snapshots may be accessible to a client of the distributed storage system via an object-based gateway, without duplicating data between file-based and object-based repositories.

Block device snapshot management component 520 may be responsible for enabling certain operations to be performed on block device snapshots that are stored at a block-based repository of the distributed storage system. In one implementation, block device snapshot management component 520 may enable an administrator of the system to implement certain permissions applicable to each object-based proxy container 562, such that a client of the system may be allowed to view, update, delete, and/or create block device snapshots using the object-based proxy container, without duplicating data between block-based and object-based repositories. For example, block device snapshot management component 520 may give clients permission to view available block device snapshots associated with a first object-based proxy container, but may disable permission to create new block device snapshots using the first object-based proxy container. For a second object-based proxy container, block device snapshot management component 520 may give clients permission to view available block device snapshots associated with the second object-based proxy container, and may also give permission to create new block device snapshots using the second object-based proxy container.

Block-based repository access component 530 may be responsible for translating object-based gateway calls (e.g., RESTful web service API calls) to block-based API calls, in order enable association of object-based proxy containers with block-based block devices. Block-based repository access component 530 may translate an object-based programming interface and data structures to a block-based programming interface and data structures that may be interpreted and executed by the block-based repository. As an illustrative example, when a client initiates a call to create a block device snapshot using a RESTful web service Create call, block-based repository access component 530 may translate Create call, and any associated parameters to an equivalent CreateSnapshot call of a block-based API. The block-based API CreateSnapshot call may then access the block device where the snapshot is to be created and may create the block device snapshot as specified by the client.

Backup policy component 540 may be responsible for creating backup policies and assigning the backup policies to object-based proxy containers based on certain conditions. A backup policy may specify a schedule for backing up data associated with a proxy container by copying the data to an external storage system. As an example, backup policy component 540 may assign a backup policy that copies data to the external system on a weekly basis to an object-based proxy container that is associated with full block device snapshots. At the same time, backup policy component 540 may assign another backup policy that copies data to the external system on a daily basis to another object-based proxy container that is associated with snapshot delta objects, thus enabling a more efficient and flexible backup scheduling based on the variability and size of the data objects associated with object-based proxy containers 562.

Figure 6:
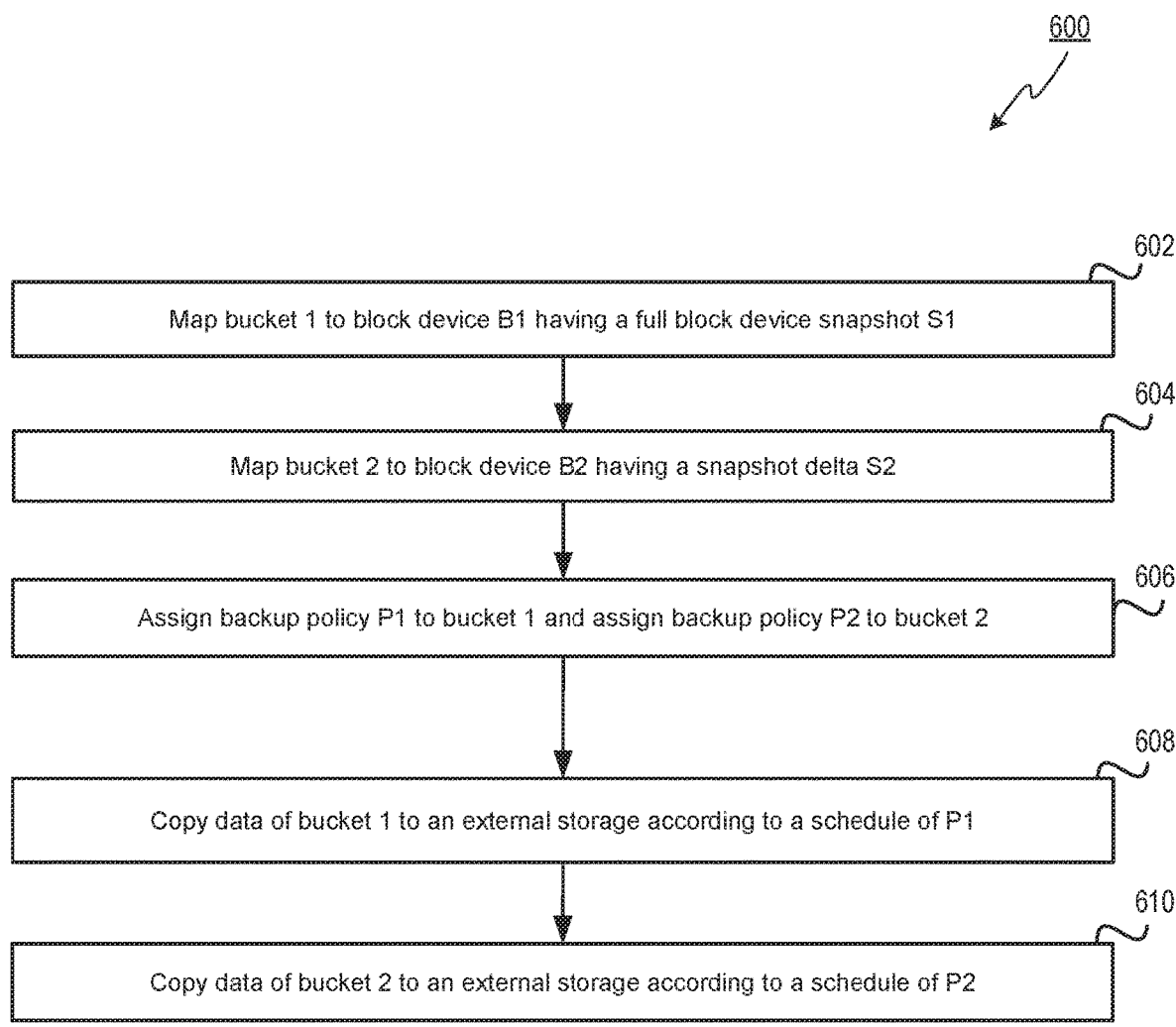
FIG. 6 is a flow diagram of an example method of enabling variable backup schedules of object-based buckets based on the type of underlying block-based data objects, in accordance with one or more aspects of the present disclosure.

FIG. 6 is a flow diagram of an example method of enabling variable backup schedules of object-based buckets based on the type of underlying block-based data objects, in accordance with one or more aspects of the present disclosure. Method 600 may be performed by processing logic that includes hardware (e.g., circuitry, dedicated logic, programmable logic, microcode, etc.), software (e.g., instructions run on a processor to perform hardware simulation), or a combination thereof. Method 600 or each of its individual functions, routines, subroutines, or operations may be performed by one or more processors of a computer system (e.g., the computer system 500 of FIG. 5 or apparatus 700 of FIG. 7) implementing the method. In an illustrative example, method 600 may be performed by a single processing thread. Alternatively, method 600 may be performed by two or more processing threads, each thread implementing one or more individual functions, routines, subroutines, or operations of the method. In an illustrative example, the processing threads implementing method 600 may be synchronized (e.g., using semaphores, critical sections, or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel or in arbitrary selected orders.

At operation 602, the processing logic may map an object-based bucket 1 to block device B1 that hosts a full block device snapshot S1. In implementations, the processing logic may map bucket 1 to block device B1 in order to enable an object-based gateway to access block device snapshot S1 that is stored at block device B1, as explained in more details herein.

At operation 604, the processing logic may map another object-based bucket 2 to block device B2 that hosts a snapshot delta object S2. In one implementation, snapshot delta object S2 may be a snapshot capturing differences in data between two snapshots of the same underlying block (e.g., the two snapshots of the blocks may have differences in data because each snapshot was captured at a different point in time). In certain implementations, a client using the object-based gateway may view snapshot delta S2 via bucket 2 and may also create new snapshots or delete existing snapshots, as explained in more details herein above.

At operation 606, the processing logic may assign backup policy P1 to bucket 1 and may also assign another backup policy P2 to bucket 2 of the distributed storage system. In implementations, a backup policy may determine a schedule for performing periodical backups of data associated with abject-based buckets. In one implementation, the backup may be performed by copying data to an external storage system where data may be retained for a specific period of time as determined by the backup policy.

At operation 608, the processing logic may perform the backup process of data associated with bucket 1 (including backup of snapshot S1) by copy data of bucket 1 to an external storage according to a schedule of policy P1. As an example, the schedule of policy P1 may specify that data may be backed up every 7 days. In this case, data of bucket 1, including S1, may be copied to the external storage system every 7 days.

At operation 610, similar to bucket 1, the processing logic may perform the backup process of data associated with bucket 2 (including backup of snapshot delta S2) by copy data of bucket 2 to an external storage according to a schedule of policy P2. As an example, the schedule of policy P2 may specify that data associated with the policy may be backed up every 24 hours. In this case, data of bucket 2, including S2, may be copied to the external storage system every 24 hours.

Figure 7:
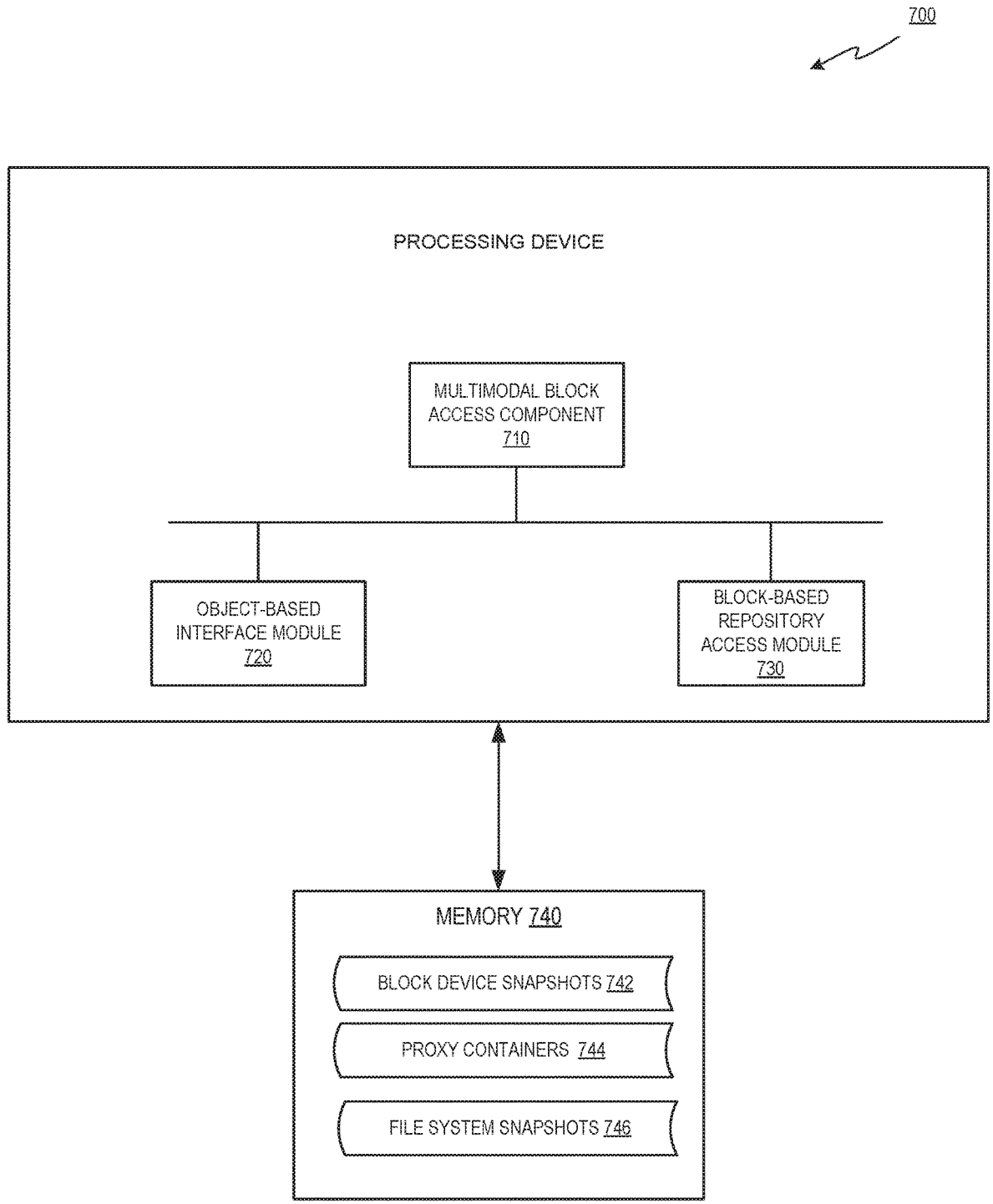
FIG. 7 depicts a block diagram of an illustrative apparatus operating in accordance with one or more aspects of the disclosure.

FIG. 7 depicts a block diagram of an illustrative apparatus 700 operating in accordance with one or more aspects of the disclosure. In various illustrative examples, apparatus 700 may be represented by computer system 100 of FIG. 1. Apparatus 700 comprises a memory 740 and processing device operatively coupled to the memory 740 and executes code implementing multimodal block access component 710, block-based repository access module 730, and object-based interface module 720. Memory 740 may store block device snapshots 742 representing snapshots of certain blocks that are accessible via block-based repository access module 730. Bock devices of block-based repository access module 730 may be associated with proxy containers 744 in order to enable multimodal access to block device snapshots 742 stored at the block devices, using an object-based interface of object-based interface module 720. Memory 740 may further store file system snapshots 746 representing snapshots of certain files and/or directories that are accessible via a file-based repository access module. The processing device of apparatus 700 may include a multimodal block access component 710 operating in accordance with one or more aspects of the present disclosure. In an illustrative example, multimodal block access component 710 may implement methods 200, 300, 400 and/or 600 of FIGS. 2, 3, 4, and 6.

Figure 8:
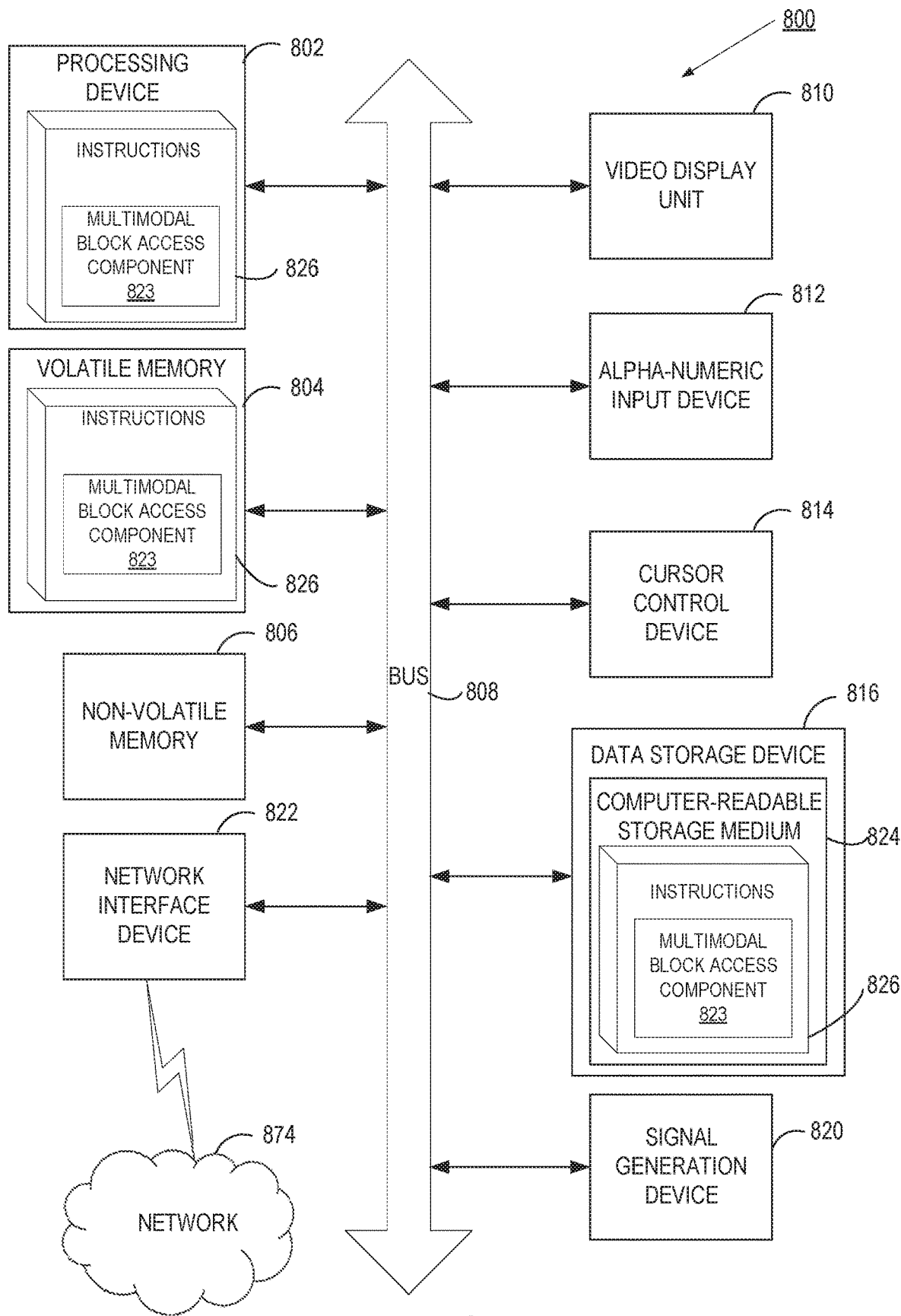
FIG. 8 illustrates a diagrammatic representation of a machine in the exemplary form of a computer system, in accordance with one or more aspects of the present disclosure.

FIG. 8 illustrates a diagrammatic representation of a machine in the exemplary form of a computer system 800 within which a set of instructions, for causing the machine to perform any one or more of the methodologies discussed herein, may be executed. The computer system 800 may correspond to computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 816 (e.g., a data storage device), which communicate with each other via a bus 850.

The processing device 802 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), network processor, or the like.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The secondary memory 821 may include a machine-readable storage medium (or more specifically a computer-readable storage medium) 828 on which is stored one or more sets of instructions 822 embodying any one or more of the methodologies or functions described herein (e.g., multimodal block access component 823). The instructions 822 may also reside, completely or at least partially, within the main memory 804 and/or within the processing device 802 during execution thereof by the computer system 800; the main memory 804 and the processing device 802 also constituting machine-readable storage media.

While computer-readable storage medium 828 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300-400 of FIGS. 3-4 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: identifying a block device snapshot stored at a block-based repository of a distributed storage system; implementing, by the processing device, an object-based proxy container associated with the block-based repository; and providing, to a client of the distributed storage system, access to the object-based proxy container via an object-based gateway of the distributed storage system.

Example 2 is a method of Example 1, wherein providing access to the object-based proxy container is performed responsive to receiving, from the client, a request, via the object-based gateway, for accessing a list of object-based proxy containers of the distributed storage system.

Example 3 is a method of Example 1 further comprising, enabling, by the processing device, the client is to perform operations on the block device snapshot comprising at least one of viewing the block device snapshot, deleting the block device snapshot, or updating metadata of the block device snapshot via the object-based gateway.

Example 4 is a method of Example 3, wherein enabling the client is to perform operations on the block device snapshot is performed based on a set of permission granted to the client by the processing device.

Example 5 is a method of Example 1 further comprising: identifying a snapshot delta object stored at a second block-based repository of the distributed storage system, wherein the snapshot delta object comprises data reflecting a difference between a second block device snapshot and a third block device snapshot; implementing, by the processing device, a second object-based proxy container associated with the second block-based repository; and providing, to the client of the distributed storage system, access to the second object-based proxy container via the object-based gateway of the distributed storage system.

Example 6 is a method of Example 5 further comprising: associating a first backup policy with the object-based proxy container; and associating a second backup policy with the second object-based proxy container, wherein the first backup policy comprises a first backup schedule for performing a first set of backup operations of the object-based proxy container and the second backup policy comprises a second backup schedule for performing a second set of backup operations of the second object-based proxy container.

Example 7 is a method of Example 1, wherein implementing the object-based proxy container associated with the block-based repository further comprises configuring the object-based proxy container to access a block device pool of the distributed storage system.

Example 8 is a method of Example 1 further comprising: translating an object-based gateway call to a block-based API call to perform a client-initiated operation on the block device snapshot Example 9 is a method of Example 1 further comprising: identifying a file system snapshot stored at a file-based repository of the distributed storage system; implementing, by the processing device, a second object-based proxy container associated with the file-based repository of the distributed storage system; and providing, to the client of the distributed storage system, access to the second object-based proxy container via the object-based gateway of the distributed storage system.

Example 10 is a system comprising: a memory; and a processing device operatively coupled to the memory, wherein the processing device is further to: receive, from a client, a request via an API call of an object-based gateway to create a block device snapshot on a block-based repository of a distributed storage system; translate the API call of the object-based gateway to a block-based API call corresponding to creating a block device snapshot at the block-based repository; and perform the block-based API call to create the block device snapshot on the block-based repository.

Example 11 is a system of Example 10, wherein the processing device is further to: provide, to the client, access to the block-based repository via the object-based gateway by implementing an object-based proxy container associated with the block-based repository of the distributed storage system.

Example 12 is a system of Example 10, wherein implementing the object-based proxy container associated with the block-based repository further comprises: configuring the object-based proxy container to access a block device pool of the distributed storage system.

Example 13 is a system of Example 10, wherein the processing device is further to: enable the client is to perform operations on the block device snapshot comprising at least one of viewing the block device snapshot, deleting the block device snapshot, or updating metadata of the block device snapshot via the object-based gateway.

Example 14 is a system of Example 13, wherein the processing device enables the client is to perform operations on the block device snapshot based on a set of permission granted to the client by the processing device.

Example 15 is a system of Example 10, wherein the processing device is further to: identify a snapshot delta object stored at a second block-based repository of the distributed storage system, wherein the snapshot delta object comprises data reflecting differences between a second block device snapshot and a third block device snapshot; implement a second object-based proxy container associated with the second block-based repository of the distributed storage system; and provide, to the client of the distributed storage system, access to the object-based proxy container via the object-based gateway of the distributed storage system.

Example 16 is a non-transitory computer-readable storage medium comprising executable instructions that, when executed by a processing device, cause the processing device to: identify a block device snapshot stored at a block-based repository of a distributed storage system; map an object-based proxy container to the block-based repository of the distributed storage system; and provide, to a client of the distributed storage system, access to the object-based proxy container via an object-based gateway of the distributed storage system.

Example 17 is a non-transitory computer-readable storage medium of Example 16, wherein the processing device is further to: enable the client is to perform operations on the block device snapshot comprising at least one of viewing the block device snapshot, deleting the block device snapshot, or updating metadata of the block device snapshot via the object-based gateway.

Example 18 is a non-transitory computer-readable storage medium of Example 16, wherein the processing device is to provide access to the object-based proxy container responsive to receiving, from the client, a request, via the object-based gateway, for accessing a list of object-based proxy containers of the distributed storage system.

Example 19 is a non-transitory computer-readable storage medium of Example 16, wherein the processing device is further to: identify a snapshot delta object stored at a second block-based repository of the distributed storage system, wherein the snapshot delta object comprises data corresponding to changes between a second block device snapshot and a third block device snapshot; map a second object-based proxy container associated with the second block-based repository; and provide, to the client of the distributed storage system, access to the second object-based proxy container via the object-based gateway of the distributed storage system.

Example 20 is a non-transitory computer-readable storage medium of Example 19, wherein the processing device is further to: associate a first backup policy with the object-based proxy container; and associate a second backup policy with the second object-based proxy container, wherein the first backup policy comprises a first backup schedule for performing a first set of backup operations of the object-based proxy container and the second backup policy comprises a second backup schedule for performing a second set of backup operations of the second object-based proxy container.

Example 21 is an electronic device, comprising: a memory; and a processing device operatively coupled to the memory, wherein the processing device is further to: receive, from a client, a request via an API call of an object-based gateway to create a block device snapshot on a block-based repository of a distributed storage system; translate the API call of the object-based gateway to a block-based API call corresponding to creating a block device snapshot at the block-based repository; and perform the block-based API call to create the block device snapshot on the block-based repository.

Example 22 is an electronic device of Example 21, wherein the processing device is further to: provide, to the client, access to the block-based repository via the object-based gateway by mapping the block-based repository to an object-based store of the distributed storage system.

Example 23 is an electronic device of Example 21, wherein to map the block-based repository to the object-based store, the processing device is further to: configure an object-based proxy container to access a block-based pool of the distributed storage system.

Example 24 is an electronic device of Example 21, wherein the client is to perform operations on the block device snapshot comprising at least one of viewing the block device snapshot, deleting the block device snapshot, or updating metadata of the block device snapshot via the object-based gateway.

Example 25 is an electronic device of Example 21, wherein the distributed storage system enables the client to access a plurality of object-based stores via the object-based gateway.

Example 26 is an electronic device of Example 25, wherein the processing device is further to: identify a snapshot delta object stored at a second block-based repository of the distributed storage system, wherein the snapshot delta object comprises data corresponding to changes between a second block device snapshot and a third block device snapshot; map the second block-based repository to a object-based store of the distributed storage system; and provide, to the client of the distributed storage system, access to the object-based store via the object-based gateway.

Example 27 is an apparatus comprising: a means to detect that a boot process for a virtual machine running is initiated; a means to identify, in a sequence of executable instructions to be executed by the virtual machine, a jump instruction associated with a safe static key; responsive to initiating the boot process, a means to replace the jump instruction with a conditional jump instruction; and responsive to detecting a completion of the boot process, a means to replace the conditional jump instruction with an unconditional jump instruction based on a value of the safe static key.

Example 27 is an apparatus comprising: a means to identify a block device snapshot stored at a block-based repository of a distributed storage system; a means to map the block-based repository to an object-based store of the distributed storage system; and a means to provide, to a client of the distributed storage system, access to the object-based store via an object-based gateway.

Example 28 is an apparatus of Example 27 wherein the means to provide access to the object-based store is responsive to a means to receive, from the client, a request for accessing a list of object-based stores of the distributed storage system.

Example 29 is an apparatus of Example 27, wherein the client is to perform operations on the block device snapshot comprising at least one of viewing the block device snapshot, deleting the block device snapshot, or updating metadata of the block device snapshot via the object-based gateway.

Example 30 is an apparatus of Example 27, wherein the distributed storage system enables the client to access a plurality of object-based stores via the object-based gateway.

Example 31 is an apparatus of Example 27, further comprising: a means to identify a snapshot delta object stored at a second block-based repository of the distributed storage system, wherein the snapshot delta object comprises data corresponding to changes between a second block device snapshot and a third block device snapshot; a means to map the second block-based repository to a second object-based store of the distributed storage system; and a means to provide, to the client of the distributed storage system, access to the second object-based store via the object-based gateway.

Example 32 is an apparatus of Example 30 further comprising: a means to associate a first backup policy with the object-based store; and a means to associate a second backup policy with the second object-based store, wherein the first backup policy has a first backup schedule and the second backup policy has a second backup schedule.

Example 33 is an apparatus of Example 27, wherein the means to map the block-based repository to the object-based store further comprises a means to configure, an object-based proxy container to access a block-based pool of the distributed storage system.

Example 34 is an apparatus of Example 27, wherein the means to provide access to the block device snapshot further comprises a means to translate an object-based gateway call to a block-based API call to perform a client-initiated operation on the block device snapshot.

Example 35 is an apparatus of Example 27 further comprising: a means to identify a file system snapshot stored at a file system repository of the distributed storage system; a means to map the file system repository to a second object-based store of the distributed storage system; and a means to provide, to the client of the distributed storage system, access to the second object-based store via the object-based gateway.

What is claimed is:

1. A method, comprising:
    identifying, by a processing device, a block device snapshot stored at a block device of a block-based repository of a distributed storage system;
    implementing, by the processing device, an object-based proxy container associated with the block device snapshot that is stored at the block device of the block-based repository, wherein implementing the object-based proxy container enables a client of the distributed storage system to access the block device snapshot using an object-based interface;
    providing, to a client of the distributed storage system, access to the object-based proxy container via an object-based gateway of the distributed storage system;
    receiving, from the client, an object-based interface call specifying an operation on the block device snapshot stored at the block device;
    translating the object-based interface call to a block-based interface call; and
    executing the block-based interface call, wherein the block-based interface call performs the specified operation on the block device snapshot stored at the block device.

2. The method of claim 1, wherein providing access to the object-based proxy container is performed responsive to receiving, from the client, a request, via the object-based gateway, for accessing a list of object-based proxy containers of the distributed storage system.

3. The method of claim 1, wherein
    the operation on the block device snapshot comprises at least one of viewing the block device snapshot, deleting the block device snapshot, or updating metadata of the block device snapshot via the object-based gateway.

4. The method of claim 3, wherein the operation on the block device snapshot is performed based on a set of permissions granted to the client by the processing device.

5. The method of claim 1 further comprising:
identifying a snapshot delta object stored at a second block-based repository of the distributed storage system, wherein the snapshot delta object comprises data reflecting a difference between a second block device snapshot and a third block device snapshot;
implementing, by the processing device, a second object-based proxy container associated with the snapshot delta object that is stored at the second block-based repository; and
providing, to the client of the distributed storage system, access to the second object-based proxy container via the object-based gateway of the distributed storage system.

6. The method of claim 5 further comprising:
associating a first backup policy with the object-based proxy container; and
associating a second backup policy with the second object-based proxy container, wherein the first backup policy comprises a first backup schedule for performing a first set of backup operations of the object-based proxy container and the second backup policy comprises a second backup schedule for performing a second set of backup operations of the second object-based proxy container.

7. The method of claim 1, wherein implementing the object-based proxy container associated with the block-based repository further comprises configuring the object-based proxy container to access a block device pool of the distributed storage system.

8. The method of claim 1, wherein translating the object-based interface call to the block-based interface call comprises:
translating the object-based interface call to an equivalent block device interface call of the block-based interface; and
translating a data structure associated with the object-based interface call to an equivalent data structure of the block-based interface.

9. The method of claim 1 further comprising:
identifying a file system snapshot stored at a file-based repository of the distributed storage system;
implementing, by the processing device, a second object-based proxy container associated with the file-based repository of the distributed storage system; and
providing, to the client of the distributed storage system, access to the second object-based proxy container via the object-based gateway of the distributed storage system.

10. A system comprising:
a memory; and
a processing device operatively coupled to the memory, wherein the processing device is to:
receive, from a client, a request via an API call of an object-based gateway to create a block device snapshot on a block-based repository of a distributed storage system;
translate the API call of the object-based gateway to a block-based API call corresponding to creating a block device snapshot at the block-based repository; and
perform the block-based API call to create the block device snapshot on the block-based repository.

11. The system of claim 10, wherein the processing device is further to:
provide, to the client, access to the block-based repository via the object-based gateway by implementing an object-based proxy container associated with the block-based repository of the distributed storage system.

12. The system of claim 11, wherein implementing the object-based proxy container associated with the block-based repository further comprises:
configuring the object-based proxy container to access a block device pool of the distributed storage system.

13. The system of claim 10, wherein the processing device is further to:
enable the client to perform operations on the block device snapshot comprising at least one of viewing the block device snapshot, deleting the block device snapshot, or updating metadata of the block device snapshot via the object-based gateway.

14. The system of claim 13, wherein the processing device enables the client to perform operations on the block device snapshot based on a set of permission granted to the client by the processing device.

15. The system of claim 10, wherein the processing device is further to:
identify a snapshot delta object stored at a second block-based repository of the distributed storage system, wherein the snapshot delta object comprises data reflecting differences between a second block device snapshot and a third block device snapshot;
implement a second object-based proxy container associated with the snapshot delta object that is stored at the second block-based repository of the distributed storage system; and
provide, to the client of the distributed storage system, access to the second object-based proxy container via the object-based gateway of the distributed storage system.

16. A non-transitory computer-readable storage medium comprising executable instructions that, when executed by a processing device, cause the processing device to:
identify a file system snapshot stored at a file-based repository of a distributed storage system;
map an object-based proxy container to the file-based repository of the distributed storage system; and
provide, to a client of the distributed storage system, access to the object-based proxy container via an object-based gateway of the distributed storage system.

17. The non-transitory computer-readable storage medium of claim 16, wherein the processing device is further to:
enable the client to perform operations on the file system snapshot comprising at least one of viewing the file system snapshot, deleting the file system snapshot, or updating metadata of the file system snapshot via the object-based gateway.

18. The non-transitory computer-readable storage medium of claim 16, wherein the processing device is to provide access to the object-based proxy container responsive to receiving, from the client, a request, via the object-based gateway, for accessing a list of object-based proxy containers of the distributed storage system.

19. The non-transitory computer-readable storage medium of claim 16, wherein the processing device enables the client to perform operations on the file system snapshot based on a set of permission granted to the client by the processing device.

20. The non-transitory computer-readable storage medium of claim 19, wherein the processing device is further to:

translate an object-based gateway call to a file-based API call to perform a client-initiated operation on the file system snapshot.

* * * * *